Sept. 27, 1966 O. L. WOOD 3,275,016
FLUID LOGIC DEVICE UTILIZING TRIGGERABLE BISTABLE ELEMENT
Filed Nov. 13, 1963
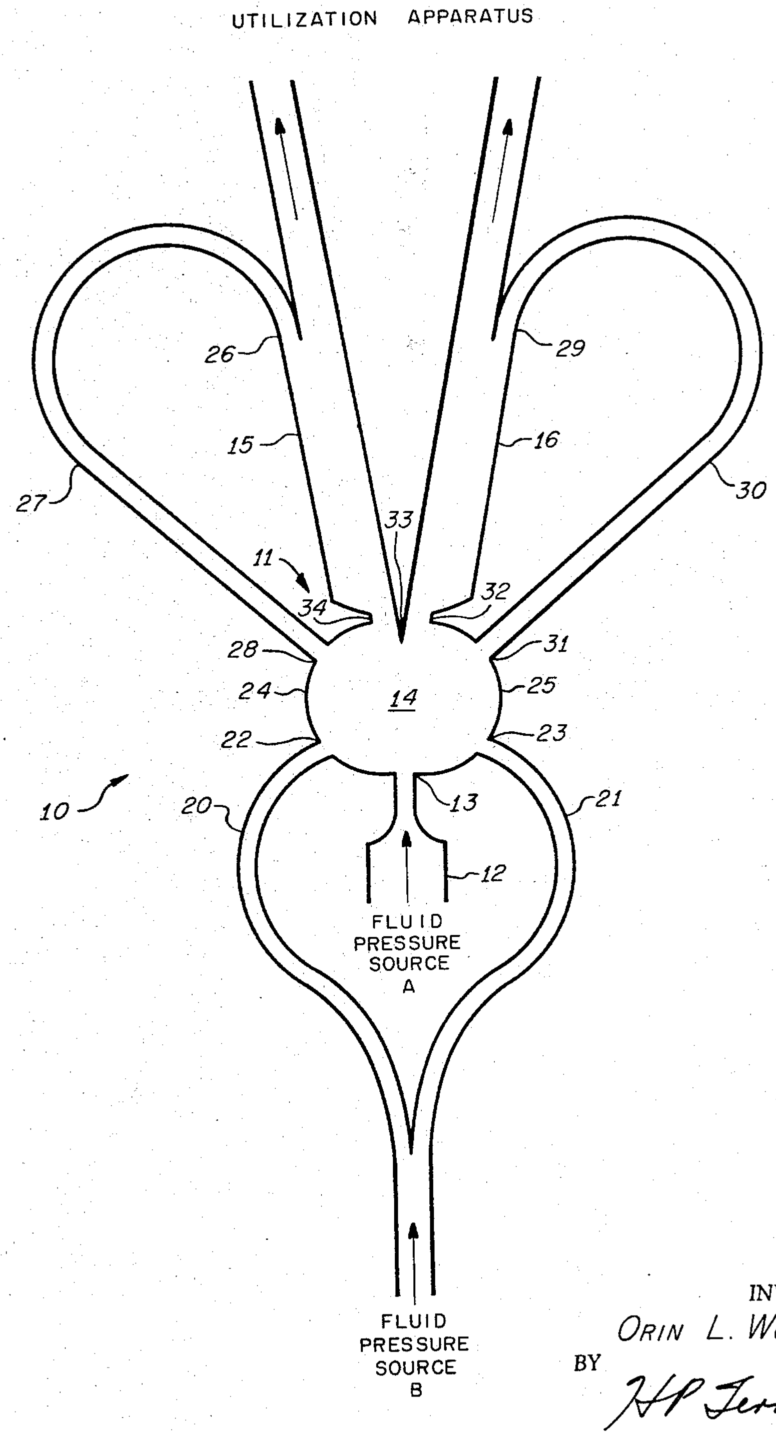
INVENTOR.
ORIN L. WOOD
BY H P Terry
ATTORNEY United States Patent Office 3,275,016
Patented Sept. 27, 1966

3,275,016

FLUID LOGIC DEVICE UTILIZING TRIGGERABLE BISTABLE ELEMENT

Orin L. Wood, Salt Lake City, Utah, assignor to Sperry Rand Corporation, Great Neck., N.Y., a corporation of Delaware Filed Nov. 13, 1963, Ser. No. 323,451
1 Claim. (Cl. 137—81.5)

The present invention relates to fluid control apparatus and particularly to pure fluid logic devices of the type suitable for use in fluid digital computer systems.

The problem of making a digital counter, partial sum or partial difference of digital functions is simplified if a triggerable flip-flop is available. The present invention provides a pure fluid triggerable flip-flop suitable for this purpose. The fluid logic apparatus of the present invention may also be utilized as an oscillator.

Prior digital computers utilized logic elements that were either electrically or mechanically operated. The electronic elements suffered from the disadvantages of being relatively delicate, sensitive to environmental conditions and relatively expensive while the equivalent mechanical elements included moving parts having high inertia characteristics and consequent slow reaction time and they tended to be susceptible to malfunctions.

In addition the triggerable flip-flop of the present invention consists of only one fluid logic element and therefore is simple and easy to construct with a high degree of reliability. Further, a minimum number of power ducts are required thus holding power consumption to the lowest possible margin.

It is therefore a primary object of the present invention to provide pure fluid logic appartus for controlling fluid flow without utilizing moving parts.

It is a further object of the present invention to provide fluid logic apparatus which produces logic functions that is relatively insensitive to environmental conditions and is extremely reliable.

It is another object of the present invention to provide a simple pure fluid logic apparatus of the triggerable flip-flop type.

The above objects are achieved by fluid logic apparatus utilizing a single fluid logic element having a power stream input channel for defining a power stream, first and second control stream input channels for defining first and second control streams, respectively, each cooperative with the power stream, first and second output channels each defining a path of fluid flow, and first and second feedback control stream input channels for defining first and second feedback control streams respectively cooperative with said power stream. To provide a binary counter, for example, the first and second control stream input channels are connected to a pulsed power source while if an oscillator is desired the first and second control stream input channels are connected to a continuous power stream source. The first control stream and the first feedback control stream input channels are cooperative in that control streams from both are required to cause deflection of the power stream in a first direction, and similarly the second control stream and the second feedback control streams are cooperative in that both are required to deflect the power stream in a second direction.

These and other objects of the present invention will become apparent by referring to the drawing which is a schematic diagram of a pure fluid logic device incorporating the present invention.

Referring to the drawing, the pure fluid logic device 10 of the present invention includes a pure fluid bistable element 11 which may be made from a plurality of flat plates as disclosed in U.S. Patent Nos. 3,001,698 and 3,030,979, although other constructions in the art are suitable for practicing the present invention. In said patents, the desired channel configuration is cut, etched, stamped, or otherwise formed in one of the plates. Since this construction is well known in the art, the present drawings shows only the channel configurations which define the paths of fluid flow for the present invention. It will be appreciated that the term "channel" as used herein refers to conduits, pipes, tubes, closed ducts, or other closed passageways for conveying fluid, and the term "orifice" includes restricted or unrestricted openings.

The bistable element 11 has a continuous power stream input channel 12 terminating at an orifice 13 in the downstream wall of a chamber 14 formed by the intersection of first and second diverging output channels 15 and 16. The input channel 12 is connected to a fluid pressure source A, as indicated by the legend, which provides a continuous fluid power stream. The orifice 13 of the input channel 12 defines the path of continuous power stream fluid flow in the chamber 14. The element 11 further includes first and second control stream input channels 20 and 21 which terminate in orifices 22 and 23, respectively, in opposed walls 24 and 25, respectively, of the chamber 14. The orifices 22 and 23 define respective paths of control stream fluid flow that are cooperative with the power stream fluid flow emanating from the orifice 13 and tend to deflect the power stream in first and second directions, respectively.

The output channels 15 and 16 are arranged symmetrically with respect to the fluid flow emanating from the orifice 13 in order that in the absence of any control stream flow from either of the orifices 22 or 23, the power stream arbitrarily flows through one of the output channels 15 or 16 and is not arranged to flow through any particular one of them.

The control stream input channels 20 and 21 are connected to receive a pulsed or a continuous power stream from a fluid pressure source B as indicated by the legend, in a manner to be more fully explained. The fluid pressure source B and the orifices 22 and 23 are so arranged that in themselves they do not provide a control stream sufficient to cause deflection of the power stream emanating from the orifice 13 from one direction to the other.

In order to provide a first feedback control stream, a flow divider 26 in the output channel 15 is connected through a feedback control stream input channel 27 which terminates in an orifice 28 in the wall 24 of the chamber 14. To provide a second feedback control stream, a flow divider 29 in the output channel 16 is connected through a feedback control stream input channel 30 which terminates in an orifice 31 in the wall 25 of the chamber 14. A portion of the fluid flowing through the output channel 15 is thus diverted through the flow divider 26 and provides a feedback control stream emanating from the orifice 28 that is cooperative with the control stream emanating from the orifice 22, the combination of which is sufficient to cause the power stream emanating from the orifice 13 to be diverted from the output channel 15 to the output channel 16. Similarly, the feedback control stream emanating from the orifice 31 in combination with the control stream from the orifice 23 is sufficient to cause the power stream emanating from the orifice 13 to be diverted from the output channel 16 to the output channel 15. The output channels 15 and 16 have extensions downstream from the respective flow dividers 26 and 29 that are connected to utilization apparatus as indicated by the legend.

With the apparatus 10 utilized as a binary counter triggerable flip-flop, the fluid pressure source A provides a continuous flow of power stream fluid while the fluid pressure source B provides a source of fluid pulses. With the fluid pressure source A providing a continuous power stream through the orifice 13, the fluid will flow out arbitrarily through either one of the output channels 15 or 16 during the intial operation. When the power stream flows through channels 15 or 16, a dynamically stable oscillating jet is formed between cusp 32 and wedge 33 or cusp 34 and wedge 33, respectively. The oscillating jet is stable in that when the jet is attached between cusp 32 and wedge 33 or between cusp 34 and wedge 33, additional energy must be imparted to the oscillating jet to cause it to switch to the opposite side of wedge 33. Assuming that the fluid is flowing through the output channel 15, a small fraction is diverted into the feedback channel 27 by the flow divider 26 while the remainder flows out the extension of the output channel 15. The feedback control stream emanating from the orifice 28 into the interaction region of the chamber 14 is insufficient in itself to cause the power stream emanating from the orifice 13 to switch from the output channel 15 to the output channel 16.

In this mode of operation, the fluid pressure source B provides fluid pulses of substantially equal magnitude through the orifices 22 and 23 simultaneously which define first and second control streams cooperative with the power stream from the orifice 13. The input fluid flow from the pressure source B is such that little or no flow occurs through the orifices 22 and 23 until a fluid pulse arrives. The fluid pulse will rise from a near zero flow value to its maximum within some small finite period of time. The bistable element 11 is arranged so that the combination of the first control stream from the orifice 22 and the feedback control stream from the orifice 28 is sufficient to overcome the effect of the control stream from orifice 23 and impart to the power stream jet oscillating between cusp 34 and wedge 33 sufficient energy to cause the jet to kink and sever itself by shedding a vortex in chamber 14 thereby causing the power stream jet to divert from the output channel 15 to flow out the output channel 16.

This results in fluid flow from the extension of output channel 16 into the utilization apparatus while a portion of the flow is diverted by the flow divider 29 to flow through the feedback channel 30 to emanate from the orifice 31 as a feedback control stream.

By the time the power stream has been deflected to flow through the output channel 16, the pulse from the fluid pressure source B is dissipated and the apparatus 10 is stable with the fluid continuing to flow through the output channel 16 because of the fact that the feedback control stream emanating through orifice 31 is insufficient in itself to impart to the power stream jet from the orifice 13 enough energy to cause the power stream jet to kink, shed a vortex in chamber 14, sever itself, and switch back to the output channel 15.

With the arrival of the next pulse from the fluid pressure source B, the combination of the control stream from the orifice 23 and the feedback control stream from the orifice is sufficient to cause deflection of the power stream from the orifice 13 to return to its original position and again flow through the output channel 15 thereby providing a complete sequence of operation. Subsequent fluid pulses from the fluid pressure source B will switch the output element 11 sequentially in the manner explained above.

When it is desired to utilize the device 10 as an oscillator, the fluid pressure source B provides a continuous flow of power stream fluid. In this embodiment, the control stream emanating from the orifice 22 and the feedback control stream emanating from the orifice 28 is arranged to switch the element 11 in one direction at full power while the combination of the control stream from the orifice 23 and the feedback control stream from the orifice 31 is arranged to automatically return the power stream from the orifice 13 to its previous condition to thereby provide oscillation. The oscillator can be designed to have a switching rate which is a function of the switching characteristics of the element 11 and the feedback control stream characteristics. For higher switching rates, it is desirable to utilize a high speed bistable fluid logic element invented by H. L. Fox and F. Goldschmied which forms the subject matter of U.S. Patent application No. 352,468, filed March 17, 1964, and entitled Multi-Mode Fluid Device.

While the invention has been described in its preferred embodiments, it is to be understood that the words which have been used are words of description rather than limitation and that changes within the purview of the appended claim may be made without departing from the true scope and spirit of the invention in its broader aspects.

What is claimed is:

A pure fluid logic device comprising, (a) a bistable pure fluid logic element having a power stream input channel for defining a power stream, first and second control stream input channels simultaneously responsive to a common control stream source for defining first and second control streams of substantialy equal magnitude respectively cooperative with said power stream, first and second output channels each defining a path of fluid flow, and a chamber formed by the intersection of said input and output channels whereby said power stream may flow through either one of said output channels in the absence of a control stream, said first and second output channels having respective first and second cusps adjacent to said chamber for providing a dynamically stable oscillating jet, (b) first and second feedback control stream input channels for defining first and second feedback control streams respectively cooperative with said power stream, (c) said first and second output channels being connected to said first and second feedback control stream input channels, respectively, and (d) said first control stream and said first feedback control stream being cooperative to cause said power stream to be deflected in a first direction and said second control stream and said second feedback control stream being cooperative to cause said power stream to be deflected in a second direction.

References Cited by the Examiner

UNITED STATES PATENTS

| | | | |
|---|---|---|---|
| 3,001,539 | 9/1961 | Hurvitz | 137—81.5 |
| 3,001,698 | 9/1961 | Warren | 137—81.5 X |
| 3,004,547 | 10/1961 | Hurvitz | 137—81.5 X |
| 3,024,805 | 3/1962 | Horton | 137—81.5 |
| 3,107,850 | 10/1963 | Warren et al. | 137—81.5 X |
| 3,185,166 | 5/1965 | Horton et al. | 131—81.5 |
| 3,193,197 | 7/1965 | Bauer | 137—81.5 X |
| 3,228,410 | 1/1966 | Warren et al. | 137—81.5 |

M. CARY NELSON, *Primary Examiner.*

S. SCOTT, *Assistant Examiner.*